United States Patent
Nicholson et al.

[15] 3,657,643
[45] Apr. 18, 1972

[54] CONTROL SYSTEM FOR ELECTRON BEAM MAGNETOMETER SENSOR

[72] Inventors: James F. Nicholson, Severna Park; Clarence Williams, Baltimore, both of Md.

[73] Assignee: Westinghouse Electric Corporation, Pittsburgh, Pa.

[22] Filed: Sept. 30, 1969

[21] Appl. No.: 862,375

[52] U.S. Cl. ............................................................ 324/44
[51] Int. Cl. ........................................................ G01r 33/02
[58] Field of Search .................... 324/41, 43, 44; 315/18, 29

[56] References Cited

UNITED STATES PATENTS

| | | | |
|---|---|---|---|
| 2,501,857 | 3/1950 | Stewart | 315/29 |
| 3,214,633 | 10/1965 | Hickey | 315/29 |
| 2,666,268 | 1/1954 | Kliever | 324/44 UX |

OTHER PUBLICATIONS

Electronics; April 3, 1967; pgs. 270–271.

Primary Examiner—Alfred E. Smith
Attorney—F. H. Henson and E. P. Klipfel

[57] ABSTRACT

Described is a control system for an electron beam magnetometer sensor of the type adapted to detect disturbances in magnetic field, particularly the magnetic field of the earth, by means of a vacuum tube containing an electron gun which emits an electron beam and directs it between spaced pole pieces located within the envelope of the vacuum tube itself. The earth's magnetic field surrounding the tube is concentrated at the gap between the pole pieces such that the presence of a magnetically permeable body near the tube will alter the magnetic field intensity across the gap and cause the electron beam to deflect. The invention resides in the provision of electrical circuitry for sensing this deflection and for indicating the existence of a disturbance and its magnitude, which circuitry is capable of detecting small time varying signals in the presence of a strong static field.

4 Claims, 6 Drawing Figures

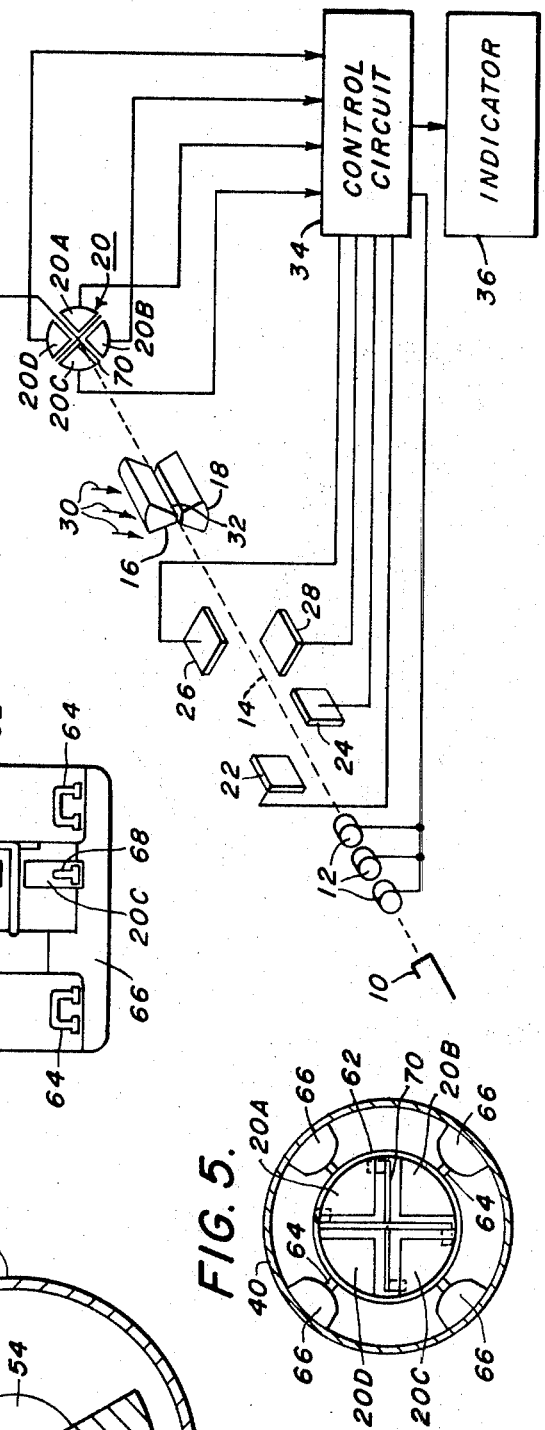

INVENTORS.
JAMES F. NICHOLSON &
CLARENCE WILLIAMS
By Ernest P. Klipfel
Attorney 3,657,643

CONTROL SYSTEM FOR ELECTRON BEAM MAGNETOMETER SENSOR

CROSS-REFERENCES TO RELATED APPLICATIONS

Copending application Ser. No. 862,376, filed Sept. 30, 1969, and copending application Ser. No. 862,278, filed Sept. 30, 1969.

BACKGROUND OF THE INVENTION

In the past, magnetometers have been devised for detecting disturbances in the earth's magnetic field on the principle that an electron beam, which is centered under the influence of a normal magnetic field, will be deflected whenever that field is disturbed. This deflection, in turn, can be sensed to actuate an alarm or can be used to drive a meter or recorder which indicates the magnitude of the deflection.

In copending application Ser. No. 862,376, filed Sept. 30, 1969 and assigned to the assignee of the present application a novel electron beam magnetometer is described which includes an evacuated envelope containing an electron gun adapted to emit a beam of electrons. This beam of electrons is directed against an electron target or collector comprising a plurality of a circle segments separated by a space therebetween. In the path of the electron beam between the gun and the target are pole pieces separated by a gap through which the electron beam passes. An external magnetic field, such as the earth's magnetic field, is concentrated across the gap between the pole pieces which are contained within the evacuated envelope itself. Preferably, the evacuated envelope on either side of the pole pieces is surrounded by a shield of magnetically permeable material which directs the magnetic field across the gap formed between the pole pieces.

When a magnetically permeable object intersects the magnetic field to which the detecting apparatus is subjected, the field existing across the aforesaid gap between the pole pieces is altered. This alteration, in turn, causes a deflection in the electron beam which can be used to actuate a meter, a recorder, or an alarm. The invention can be used, for example, where it is desired to detect concealed weapons. In this case, the earth's magnetic field is that field to which the detecting apparatus is subjected. When an individual carrying a concealed weapon, for example, intersects the magnetic field adjacent the detecting device, the electron beam is immediately deflected to indicate the existence of the concealed weapon.

SUMMARY OF THE INVENTION

As an overall object, the present invention seeks to provide new and improved circuitry for controlling a magnetometer sensor of the type described above.

More specifically, an object of the invention is to provide a control system of the type described wherein circular segments comprising a target for an electron beam in a magnetometer are connected to the vertical and horizontal deflection plates of an electron gun whereby an electron beam, when it is caused to deflect, increases the negative charge on one of the plurality of sectors forming the target to increase the charge on one of the vertical or horizontal deflection plates of the electron gun to again center the electron beam emitted by the gun.

Still another object of the invention is to provide a control system of the type described which is simple in construction and which not only indicates the magnitude of the disturbance in the field sensed by the magnetometer but also actuates an alarm when the magnitude of the disturbance exceeds a predetermined limit.

In accordance with the invention, apparatus for detecting disturbances in a magnetic field is provided comprising an evacuated envelope containing an electron gun adapted to emit a beam of electrons. This beam of electrons is directed against an electron target or collector. In the path of the electron beam between the gun and the target are pole pieces separated by a gap through which the electron beam passes. An external magnetic field, such as the earth's magnetic field, is concentrated across the gap between the pole pieces which are contained within the evacuated envelope itself.

The electron target or collector against which the electron beam is directed is divided into circular sectors, preferably four in number, which are separated by a space therebetween. In the space between the sectors is a knife-edge comprising a negatively charged plate, which is in a form of a cross in the case of four circular sectors. This knife-edge, being negatively charged, will repel electrons, prevent them from passing through the space between the sectors, and evenly scatter the electrons from the beam onto the four sectors when the beam is centered. However, when a magnetically permeable object intersects the magnetic field to which the detecting apparatus is subjected, the magnetic field existing across the aforesaid gap between the pole pieces is altered. This alteration, in turn, causes a deflection in the electron beam which unbalances the negative charges on the sectors of the target.

In the case of a target comprising four circular sectors, two of the sectors are connected to the horizontal deflection plates of the electron gun while the other two are connected to the vertical deflection plates, the arrangement being such that when the electron beam moves off center in the horizontal direction, for example, the negative charge on one of the two horizontal deflection plates will be increased, thereby causing the beam to again move toward center. The operation of the other two opposite sectors and the vertical deflection plates is the same. The horizontal deflection plates are connected through filters and amplifiers to a meter which indicates the magnitude of the deflection and to an alarm circuit which is actuated whenever the deflection exceeds a predetermined magnitude, indicating the existence of a magnetically permeable object in the field above a lower, limiting size. The filters attenuate all signals above about 10 hertz and, thus, provide effective isolation from noise or other spurious signals.

The above and other objects and features of the invention will become apparent from the following detailed description taken in connection with the accompanying drawings which form a part of this specification, and in which:

FIG. 1 is a schematic illustration of the magnetometer apparatus of the present invention;

FIG. 2 is a cross-sectional view of the magnetometer of the invention;

FIG. 3 is a cross-sectional view taken along line III—III of FIG. 2;

FIG. 4 is a broken-away elevational view of the electron target utilized in the magnetometer of FIG. 2;

FIG. 5 is an end view of the apparatus shown in FIG. 4; and

Figure 6:
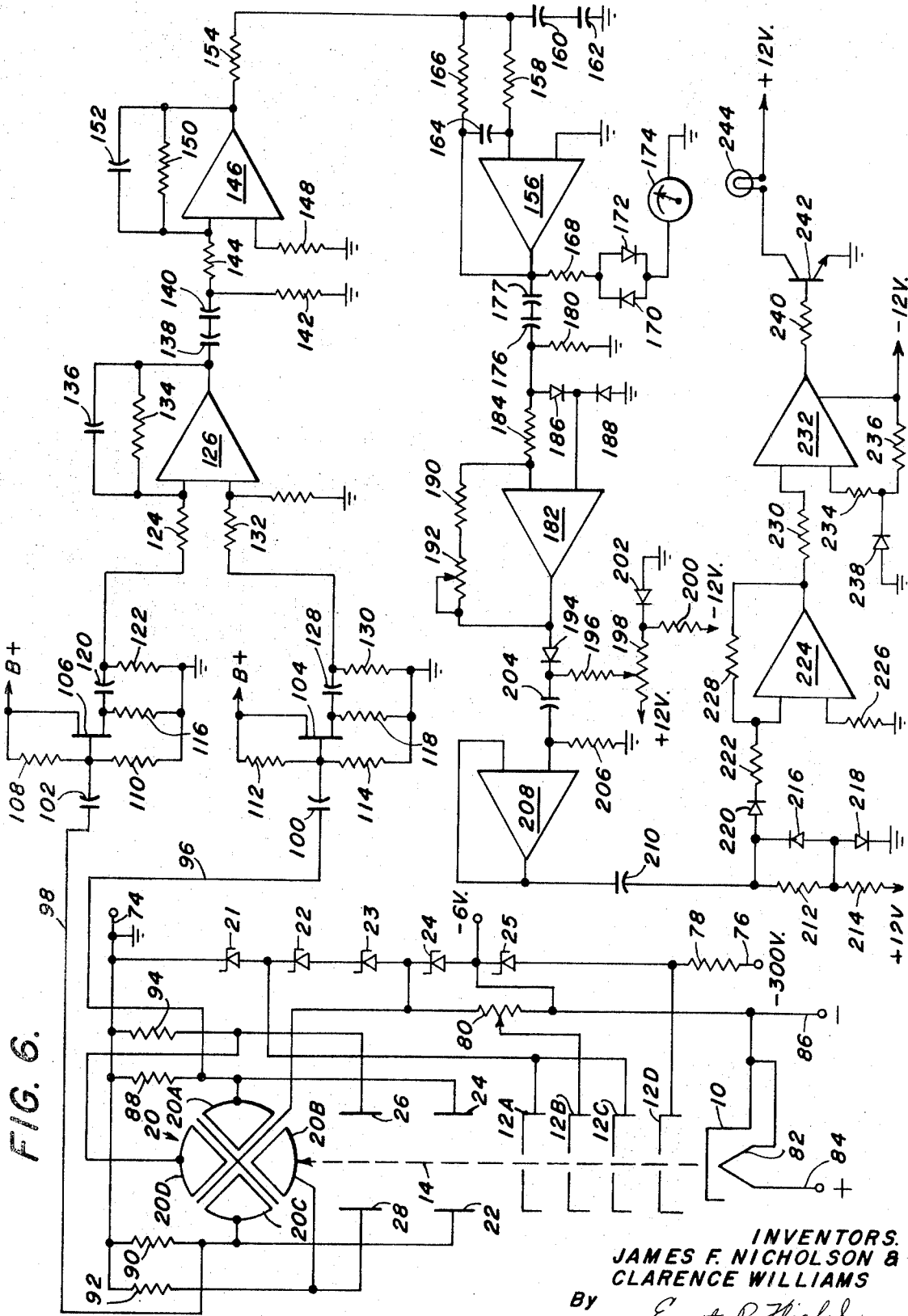
FIG. 6 is a schematic circuit diagram of the control apparatus of the present invention for the magnetometer shown in FIGS. 2–5.

With reference now to the drawings, and particularly to FIG. 1, the magnetometer of the invention includes an electron-emitting cathode 10 and a plurality of focusing grids 12 which direct an electron beam 14 between pole pieces 16 and 18 and onto a split target or collector 20 which serves the function of an anode in a conventional electron gun. The electron beam 14, after being focused by the grids 12, passes between horizontal deflection plates 22 and 24 and vertical deflection plates 26 and 28. The earth's magnetic field, indicated by the arrows 30 in FIG. 1, passes through the upper pole piece 16, thence across gap 32 which separates the pole pieces, and then to the pole piece 18. In so doing, the magnetic field, which is concentrated at the gap 32, intersects the beam 14.

The target 20 is divided into four sectors 20A, 20B, 20C and 20D as shown. These sectors are connected to a control circuit 34, hereinafter described in detail in connection with FIG. 6 of the drawings. The control circuit 34, in turn, is connected to the horizontal deflection plates 22 and 24 as well as the vertical deflection plates 26 and 28.

Let us assume, for example, that the electron beam 14 is deflected by the magnetic field existing across the gap 32 such that it is directed onto the sector 20A. Under these circumstances, the electron beam has been deflected to the right as viewed in FIG. 1. The control circuit 34 senses the increased negative charge on the sector 20A and, in turn, increases the negative charge on the right horizontal deflection plate 24, thereby moving the electron beam back toward the center of the device, or to the left. Similarly, if the electron beam 14 should move upwardly onto sector 20D, the control circuit 34 will increase the negative charge on the upper vertical deflection plate 26, thereby causing the electron beam 14 to move downwardly, toward the center. In this manner, whenever the electron beam is deflected, it is automatically recentered by the control circuit 34 and the vertical and horizontal deflection plates. At the same time, when an unbalanced condition occurs on the sectors 20A-20D with one sector being charged more negatively than the others, this is sensed by the control circuit 34 which actuates an indicator or an alarm 36 which indicates the existence of a magnetically permeable object in the field 30 which caused the deflection of the electron beam 14. The control circuit 34 and the alarm 36 will hereinafter be described in greater detail.

The mechanical details of an actual magnetometer are shown in FIG. 2. It comprises two glass envelopes 38 and 40 interconnected by means of an assembly including a pair of generally annular, threaded members 42 and 44. The member 44, for example, has an annular flange 46 welded or otherwise securely fastened to its rear surface. This annular flange 46, in turn, forms a glass-to-metal seal with the glass envelope 40. Likewise, the annular member 42 is provided with an annular flange 50 projecting rearwardly which is hermetically sealed to the right end of the glass envelope 38.

The tubular members 42 and 44 are interconnected by means of a cylindrical spacer 52 which is hermetically sealed to the two members 42 and 44. The members 42 and 44 are provided with central openings 54 which connect the annular chamber 56 formed by spacer 52 with the interiors of the glass envelopes 38 and 40. In this manner envelope 38, the chamber 56 formed by the annular spacer 52 and the glass envelope 40 form a contiguous enclosure which is evacuated.

Integrally formed with the member 42 is the lower pole piece 18 schematically illustrated in FIG. 1. The pole piece 18, as best shown in FIG. 3, forms an approximate segment of a circle. Similarly, the upper pole piece 16 is integrally formed with the member 44 and, in cross section, is also in the form of an approximate segment of a circle as viewed in FIG. 3. The space between the two pole pieces 16 and 18 forms the gap 32 referred to with respect to FIG. 1 and through which the electron beam 14 passes.

The cathode 10, grids 12 and deflection plates 22-28 of FIG. 1, generally indicated by the reference numeral 58 in FIG. 2, are all contained within the glass envelope 38 connected to the member 42. Connections to these elements are by prongs 59 projecting through the envelope 38. The split target 20, on the other hand, is contained within the glass envelope 40 and is provided with projecting prongs 61 for connection to external circuitry described in connection with FIG. 6. Electrons emitted by the electron gun 58 will pass through opening 54 of member 42, the gap 32, and opening 54 in member 44 to the split target 20.

Threaded onto the annular members 42 and 44 are two shields 63 and 65 of magnetically permeable material, such as iron. These shields act, in effect, as collectors of an external magnetic field, indicated by the arrows 30, and direct the field across the gap 32. Thus, the entire magnetic field surrounding the device is concentrated at the gap 32 through which the electron beam passes. All other parts of the device such as the deflection plates and target 20 are essentially unaffected by the field. A change in the surrounding field due to the entrance of a magnetically permeable object will, in effect, be magnified at the gap to cause the electron beam to deflect with great sensitivity. The cylindrical spacer 52 is formed from other than magnetically permeable material to provide an area of magnetic isolation, except through the pole pieces.

The details of the target 20 are shown in FIGS. 4 and 5. It comprises a pair of cylindrical members 60 and 62 provided with clips 64 embedded in insulating glass spacers 66 which engage the inner periphery of the glass envelope 40. Intermediate the two cylindrical members 60 and 62 is the split target 20 itself comprising the four segments 20A-20D. These four segments are provided with clips 68 also embedded in the glass spacer 66. Secured to the rear edge of the annular member 62 is knife-edge 70, in the form of a cross, which extends through the slots formed between the four quadrants of the collector 20A-20D. This knife-edge, in turn, is connected to a source of negative potential as shown in FIG. 1. In actual practice, the knife-edge and sectors shown in FIG. 5 will be tilted at an angle of 45° with respect to the horizontal and vertical deflection plates such that sectors 20A and 20C are responsive to horizontal excursions of the beam while sectors 20B and 20C are responsive to vertical excursions.

The purpose of the knife-edge is to deflect the beam evenly on either side of the center of the target or collector assembly 20. If it were not for the knife-edge, the beam would tend to pass through the openings formed between the quadrants 20A-20D and the sensitivity of the device would suffer. However, with the knife-edge negatively charged, the beam tends to split evenly in all directions. In the absence of deflection of the beam 14 due to a magnetic disturbance, the system is balanced with the beam remaining on-center.

With reference now to FIG. 6, elements shown therein which correspond to elements shown in FIG. 1-5 are identified by like reference numerals. The magnetometer is provided with a pair of input terminals 74 and 76. Terminal 74 is grounded; whereas terminal 76 is connected to a source of -300 volts. Connected between the terminals 74 and 76 is a voltage divider comprising five Zener diodes Z1 through Z5. The grids 12 are four in number, and identified in FIG. 6 as 12A, 12B, 12C and 12D. Grid 12D is connected to the anode of Zener diode Z5 and is at a potential of about -274 volts by virtue of the voltage drop across resistor 78. Grids 12A and 12C are both connected to the junction of Zener diodes Z1 and Z2 and are at a potential of about -35 volts. Finally, grid 12B is connected to a movable tap on potentiometer 80 connected between the anode and cathode of Zener diode Z4 which are at potentials of about -250 volts and -218 volts, respectively. The cathode 10 is connected to the junction of Zener diodes Z4 and Z5 and is at a potential of about -250 volts. Cathode 10 is provided with a heater 82 connected to a 6-volt heater supply via terminals 84 and 86.

The horizontal sectors 20A and 20C are connected through resistors 88 and 90 to input terminal 74 and, hence, are essentially at ground potential. Similarly, the vertical sectors 20B and 20D are connected through resistors 92 and 94 to the same input terminal 74. The knife-edge 70 is connected to the junction of Zener diodes Z3 and Z4 and is at a potential of about -218 volts. As a result, it is at a much lower negative potential than the sectors 20A-20D and, consequently, scatters the electron beam evenly onto the sectors, assuming that the beam is not deflected under the influence of a change in the magnetic field across gap 32.

The sectors 20A and 20C are connected directly to the horizontal deflection plates 24 and 22, respectively. Similarly, the upper and lower sectors 20D and 20B are connected directly to the upper and lower vertical deflection plates 26 and 28, respectively. It might be expected that a variation in the magnetic field across the gap 32 would normally cause the electron beam to move either to the right or left in the horizontal direction as viewed in FIG. 1. It has been found, however, that the beam will move not only to the right or the left but also upwardly or downwardly; and it is for this reason that the sectors 20B and 20D are needed along with the vertical deflection plates 26 and 28.

In any event, the beam will diverge to the right or left upon the introduction of a magnetically permeable body into the field and, accordingly, the sectors 20A and 20C are connected through leads 96 and 98 and capacitors 100 and 102 to the gate electrodes of two field effect transistors 104 and 106. The field effect transistors are the first stages of an indicating circuit. Under balanced conditions, the electron beam 14 will be equally split between sectors 20A and 20C and between sectors 20B and 20D. If a field in the gap 32 shown in FIG. 1 acts to deflect the beam onto sector 20A as explained above, this sector goes more negative; and, thus, horizontal deflection plate 24 which also goes more negative, deflects the beam back to the center of the tube.

Coupling capacitors 100 and 102 AC couple sectors 20A and 20C respectively to transistors 104 and 106 respectively to place a low frequency limit on the operation of the indicating circuit. They prevent the indicating circuit from being a DC system by charging up to a magnitude which is directly related to the voltage on the respective target sectors. When a new magnetic field disturbance occurs, the charge on the capacitors is changed in order to provide a new indication.

The gate electrode of the field effect transistor 106 is connected to the junction of resistors 108 and 110 connected between a source of positive potential and ground. Similarly, the gate electrode of field effect transistor 104 is connected to the junction of resistors 112 and 114 connected between a source of positive potential and ground. The drain electrodes of field effect transistors 104 and 106 are connected to sources of positive potential; whereas their source electrodes are connected through resistors 116 and 118 to ground.

The source electrode of field effect transistor 106 is also connected through capacitor 120 and resistor 122 to ground, the voltage across the resistor 122 being applied through resistor 124 to one input of a differential amplifier 126. Similarly, the source electrode of field effect transistor 104 is connected through capacitor 128 and resistor 130 to ground, the voltage appearing across resistor 130 being applied through resistor 132 to the other input of the differential amplifier 126. The amplifier 126 is provided with a feedback loop including a resistor 134 in shunt with capacitor 136. The capacitor 136, having a value of about 0.056 microfarad, acts as a filter which attenuates signals having a frequency above 10 hertz. In this respect, the impedance of the capacitor 136 drops practically to zero when the frequency exceeds 10 hertz and, thereby, shorts out the resistor 134. With this arrangement, extremely good isolation from noise signals above 10 hertz is provided.

The output of the differential amplifier 126, comprising a signal proportional to the difference between the potentials on sectors 20A and 20C, is applied through coupling capacitors 138 and 140 across resistor 142. The voltage across resistor 142 is applied through resistor 144 to one input of a second amplifier 146, the other input of which is connected to ground through resistor 148. Amplifier 146, like amplifier 126, is provided with a feedback path including resistor 150 connected in shunt with capacitor 152. The capacitor 152, like capacitor 136, acts as a rough 10-hertz filter for signals passing through the amplifier. The two amplifiers 126 and 146 are employed rather than a single amplifier in order to divide the gain required between the two amplifiers.

The output of the amplifier 146 is applied through resistor 154 to a 10-hertz filter comprising an operational amplifier 156 having one of its input terminals connected to ground through resistor 158 and capacitors 160 and 162. This same input terminal is connected through capacitor 164 and resistor 166 to one end of resistor 154; and is also connected through capacitor 164 to the output of the operational amplifier 156. The other input terminal of the operational amplifier 156 is grounded as shown. The 10-hertz filter thus provides gain as well as attenuation of signals at a frequency above 10-hertz.

The output of the operational amplifier 156 is applied through resistor 168 and rectifiers 170 and 172 to a meter 174 which indicates the magnitude of the pulses at the output of amplifier 146. These same pulses are applied through capacitors 176 and 177 across resistor 180. The voltage across resistor 180 is then rectified in a full-wave rectifier comprising operational amplifier 182, one terminal of which is connected through a resistor 184 to the capacitor 176, and the other input terminal of which is connected to the junction of diodes 186 and 188 connected between one end of the resistor 184 and ground. The upper input terminal of the operational amplifier 182 is also connected through resistors 190 and 192 to its output.

At the output of the full-wave rectifier is a clipping diode 194 having its cathode connected through resistor 196 to a potentiometer 198 having one terminal connected to a source of +12 volts and its other terminal connected through resistor 200 to a source of −12 volts, as well as through diode 202 to ground. By adjusting the potential on the cathode of diode 194, the bottom portion of the pulses at the output of the amplifier 182 can be clipped. These pulses are applied through capacitor 204 and a resistor 206 to one input of an operational amplifier 208 which acts as an isolation amplifier. The output of the isolation amplifier, comprising the clipped pulses, is then applied through capacitor 210 to a direct current restoring network including resistors 212 and 214 connected to a source of +12 volts. The junction of resistors 212 and 214 is connected to the junction of two diodes 216 and 218 connected between the upper terminal of resistor 212 and ground. The direct current restoring circuit is needed since the bottom portions of the pulses have been clipped and, therefore, it is necessary to establish a direct current reference potential.

The restored pulses are then applied through diode 220, which acts as a non-linear resistance element, and resistor 222 to one input of an operational amplifier 224, the other input of which is connected through resistor 226 to ground. As the input pulses go more positive, the gain of the amplifier 224 increases. That is, the gain is a function of the amplitude of the input signal. One input of the operational amplifier is connected to its output through resistor 228 as shown.

The output of operational amplifier 224 is connected through resistor 230 to one input of a comparator operational amplifier 232 which compares the amplitude of the pulses at the output of amplifier 224 with a reference potential established by resistors 234 and 236 along with diode 238. Assuming that the amplitude of the pulse at the output of operational amplifier 224 exceeds the reference potential applied to the other input terminal of the operational amplifier 232, an output is produced which is applied through resistor 240 to the base of transistor 242 to energize a lamp 244. As will be understood, other and different types of alarms can be used to indicate the existence of a magnetically permeable object above a given mass in the field to which the magnetometer is subjected.

Although the invention has been shown in connection with a certain specific embodiment, it will be readily apparent to those skilled in the art that various changes in form and arrangement of parts may be made to suit requirements without departing from the spirit and scope of the invention. In this respect, it will be apparent that vertical and horizontal deflection coils, rather than deflection plates can be used in the invention with equal effectiveness.

We claim as our invention:

1. In apparatus for detecting disturbances in a magnetic field caused by imposition of a magnetically permeable member in said field, the combination of an evacuated envelope containing an electron emitting cathode and a plurality of focusing grids through which a beam of electrons emitted by said cathode passes, at least one pair of oppositely disposed beam deflection devices within said envelope, a pair of pole pieces separated by a gap through which said electron beam passes, said pole pieces in cross section defining oppositely-disposed segments of a circle with said gap being between the radially innermost ends of said segments, means for causing said magnetic field to pass across said gap, a target against which said electron beam is directed after passing between said pole pieces, said target being formed from at least two separated parts, means electrically connecting one of said parts to one of said oppositely disposed beam deflection devices, means connecting the other of said parts to the other of said oppositely disposed beam deflection devices, the arrangement being such that when the beam is deflected from a central position the negative charge on one of said parts will be increased to cause the beam deflection device to which it is connected to again center said beam, differential amplifier means connected to the respective parts of said target and adapted to produce an output signal equal to the difference between the charges on the respective parts of the target, operational amplifier means and rectifying means coupled to the output of said differential amplifier means for producing a direct current signal proportional in magnitude to the difference output of said differential amplifier means, meter means coupled to said rectifying means for indicating the magnitude of said direct current signal, and alarm means coupled to said operational amplifier means for indicating deflection of said beam above a predetermined amount.

2. The apparatus of claim 1 wherein said beam deflection devices comprise electrostatic deflection plates connected directly to the respective parts of said target.

3. The apparatus of claim 1 wherein said beam deflection devices comprise horizontal electrostatic deflection plates and vertical electrostatic deflection plates, said target being formed from four parts, two oppositely disposed parts of said target being connected to the respective horizontal deflection plates and the other two oppositely disposed parts being connected to said vertical deflection plates.

4. The apparatus of claim 2 including capacitor means connected to the respective parts of said target for storing at least a portion of the electrical charge on said parts.

* * * * *